July 9, 1957

A. L. GIRARDI 2,798,623

FRUIT PICKING MACHINE

Filed March 7, 1955

INVENTOR.
Antonio Lawrence Girardi
BY

Attorney

July 9, 1957  A. L. GIRARDI  2,798,623
FRUIT PICKING MACHINE

Filed March 7, 1955  4 Sheets-Sheet 2

INVENTOR.
Antonio Lawrence Girardi
BY
Attorney

July 9, 1957 — A. L. GIRARDI — 2,798,623
FRUIT PICKING MACHINE
Filed March 7, 1955 — 4 Sheets-Sheet 3

INVENTOR.
Antonio Lawrence Girardi
BY
Attorney

July 9, 1957     A. L. GIRARDI     2,798,623

FRUIT PICKING MACHINE

Filed March 7, 1955     4 Sheets-Sheet 4

INVENTOR.
Antonio Lawrence Girardi

BY

Attorney

United States Patent Office 2,798,623
Patented July 9, 1957

2,798,623

FRUIT PICKING MACHINE

Antonio Lawrence Girardi, Stockton, Calif.

Application March 7, 1955, Serial No. 492,433

11 Claims. (Cl. 214—83.1)

This invention relates to orchard apparatus, and particularly to a mobile carriage provided with a plurality of platforms shiftable by power actuated means controlled by workmen supported upon the platforms for independent movement around adjacent trees of adjacent rows.

It is among the objects of this invention to provide a mobile carriage provided with power actuated platforms shiftable vertically, horizontally and angularly relative to adjacent trees for permitting workmen to perform operations upon a plurality of trees simultaneously as the carriage is advanced step by step between adjacent rows of trees.

It is also an object of this invention to provide an apparatus by which workmen may harvest fruit simultaneously from trees adjacent the four corners of a rectangular carriage, each workman being enabled to shift his position around a tree independently of other workmen operating around other trees.

Another object is to provide an apparatus provided with a carriage having frame portions extensible from opposite ends of the carriage to project between adjacent trees of two adjacent rows, and provided with power actuated platforms independently shiftable vertically, horizontally and angularly, the frame portions being movable between normal retracted positions and outwardly extending positions projecting from the ends of the carriage.

A further object is to provide an apparatus provided with a set of four platforms each shiftable with a substantially universal movement around one half of a tree, the four platforms being independently shiftable relative to adjacent trees of adjacent rows between which the apparatus is centered.

A further object is to provide an apparatus which may be readily advanced along the aisle between two rows of trees, and which is provided with platforms to give access to large areas of the adjacent trees for purpose of pruning, spraying, harvesting or other operations, without damaging the trees or fruit growing thereon.

Another object is to provide a mobile apparatus which may be advanced, steered and manipulated with facility such as to make practicable the separate and successive harvesting of early and late ripening fruit.

It is also an object of the invention to provide conveying means associated with each of a plurality of independently shiftable platforms whereby fruit harvested from a plurality of trees at each setting position may be delivered to a common packing or loading station on or near the carriage.

A still further object is to provide power operated picking platforms operable around trees in groups of four, each of the platforms being controlled by a workman supported thereon independently of the platforms occupied and controlled by other workmen, and each platform being movable to give a workman access to substantially half the area of a tree, without shifting the main carriage upon which the platforms are mounted.

The invention has other objects and features of advantage, some of which with the foregoing will be explained in connection with the illustrative embodiment of the invention shown in the accompanying drawings forming part of the present specification. It is to be understood that the invention is not limited to the structural features shown in the drawings, as it may be embodied in a variety of forms within the scope of the appended claims.

Figure 1:
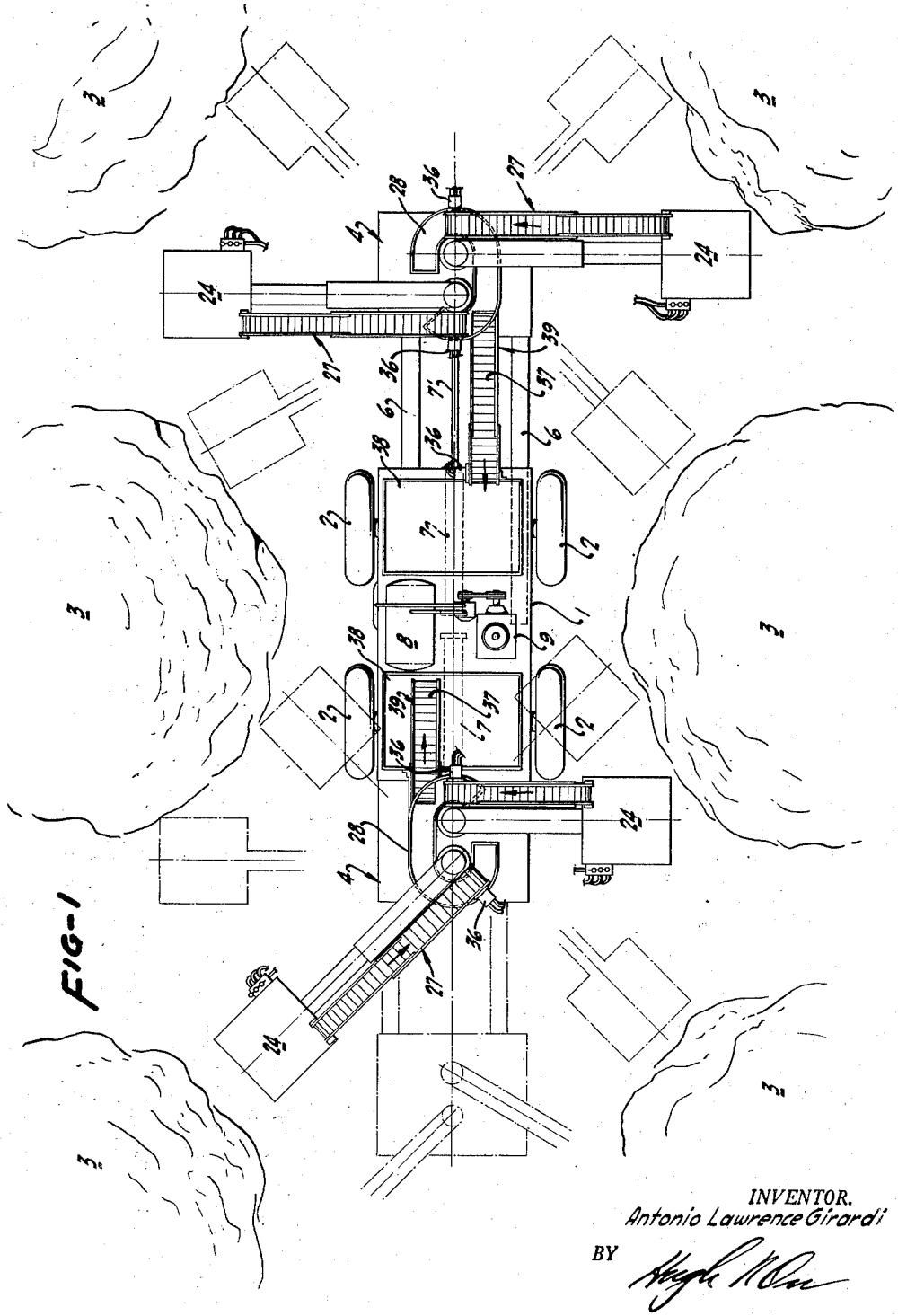
Fig. 1 is a diagrammatic plan view of a machine embodying the invention and illustrating its operation.
Figure 2:
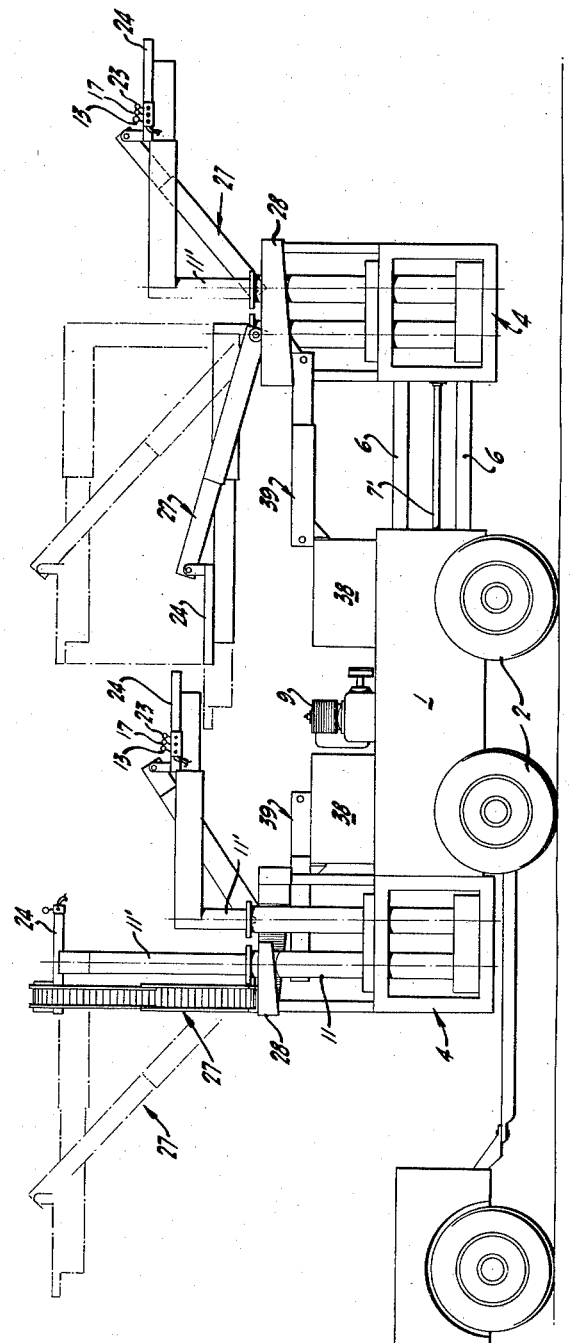
Fig. 2 is a side elevational view of the apparatus of Fig. 1.
Figure 3:
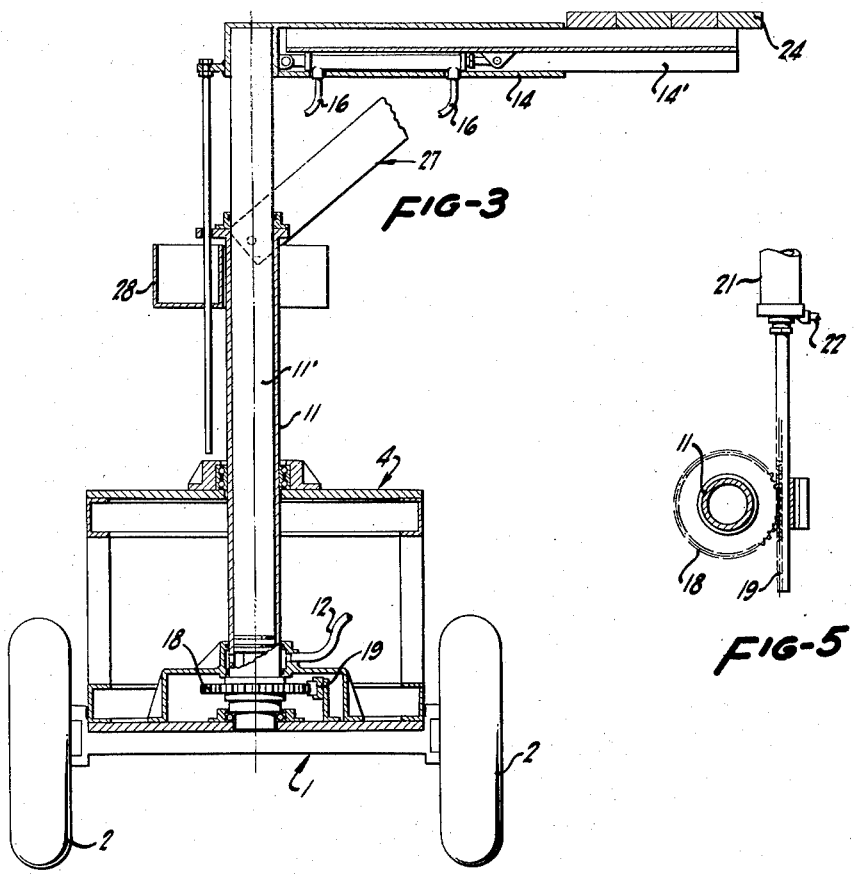
Fig. 3 is a fragmental detail view, partly in section, illustrating the vertical and horizontal adjustment of the platform supporting and manipulating means.
Figure 5:
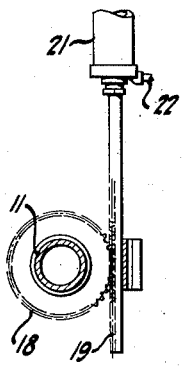
Fig. 5 is a fragmental detail view, partly in section, illustrating the angular adjustment of the platform supporting means.
Figure 4:
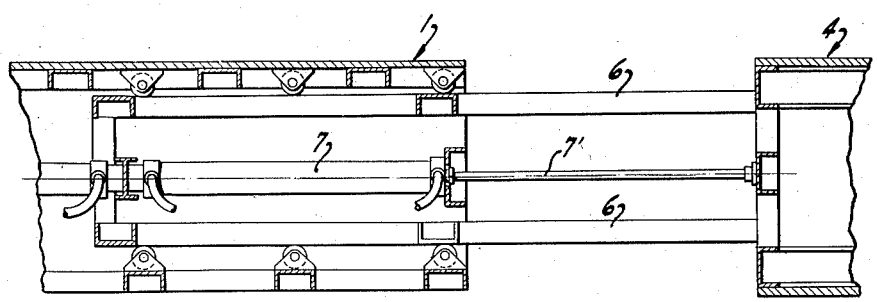
Fig. 4 is a fragmental sectional detail view showing the axial movement of the extensible frame members.
Figure 6:
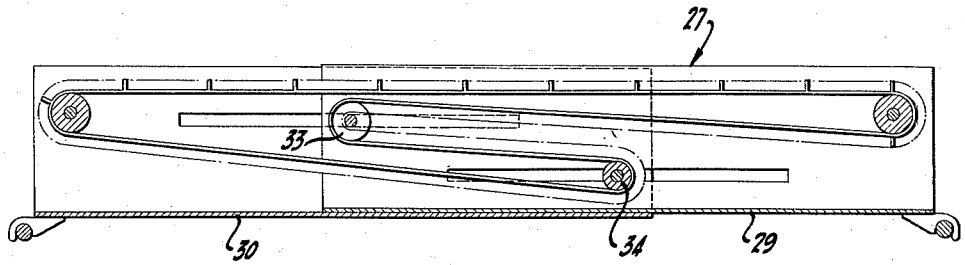
Fig. 6 is a diagrammatic view of the conveying mechanism associated with each platform.

In terms of broad inclusion, the orchard apparatus of this invention comprises a mobile carriage provided with a pair of frame sections extensible longitudinally from opposite ends of the carriage between adjacent trees of adjacent rows of trees. Each extensible frame section is provided with a pair of independently manipulatable platforms mounted for vertical, horizontal and angular adjustment relative to the carriage and extensible frame sections. Preferably the platforms are moved by hydraulic means independently controlled by workmen occupying the various platforms so that each workman may move himself around the adjacent half of an adjacent tree, with workmen operating in groups of four upon adjacent trees as the carriage is advanced step by step between adjacent rows of trees throughout an orchard. The invention also contemplates the provision of an endless conveyor extensible and manipulatable with the platforms for delivering fruit as it is picked to a central loading point on or adjacent to the carriage. The carriage is preferably provided with means for steering all four of its supporting wheels; and it may be self-propelled, or it may be towed by a suitable tractor. In either case, a central power unit maintains hydraulic or other motive force for operating the platforms as they are manipulated around adjacent trees. Preferably, the supports for the manipulatable platforms are arranged to be shifted transversely of the longitudinally extensible frame sections so that the platforms may be retracted to minimize the overall width of the machine and permit the platforms to be advanced between trees without injury thereto.

In terms of greater detail, the apparatus of this invention comprises a main carriage 1 supported upon wheels 2 for movement between adjacent rows of trees 3 of an orchard. Preferably all of the wheels 2 are movable for steering the carriage, so that it may be turned upon a short radius at the end of a row of trees.

Frame sections 4 are slidably mounted upon the carriage 1 for movement outwardly from opposite ends of the carriage between adjacent rows of trees between which the carriage is advanced. The frame sections 4 are supported on guides 6, and are arranged to be extended and retracted by means of hydraulic rams having cylinders 7 mounted upon the carriage and having piston rods 7' attached to the frame sections 4 in any suitable manner. Fluid for operating the piston rods 7' is supplied from a central reservoir 8 in which hydraulic pressure of desired degree is maintained by an internal combustion engine 9, or other suitable power unit.

Vertically disposed platform supporting columns 11, which may be in the form of hydraulic cylinders, are mounted in pairs upon the outer ends of the extensible frame sections 4. Preferably each column 11 comprises telescoping inner and outer sections, each inner section being movable from a normal position in fully telescoped relation to its outer section to an extended position projecting a desired distance above the carriage. Fluid from the reservoir 8 is introduced into the cylinders 11 through flexible hose connections 12 provided with control valves 13.

Upon the upper end of the extensible inner section 11' of each vertical column 11 is mounted a hydraulically actuated arm 14 disposed in a substantially horizontal position extending laterally from the top of its column 11. Each arm 14 comprises telescoping outer and inner sections. The inner section 14' is operated by a piston and piston stem, and is movable between a fully telescoped position within the outer section and an outwardly extending position. Fluid for actuating each inner section to and from its telescoped position is supplied from the reservoir 8 through flexible hose connections 16 provided with control valves 17.

The vertical columns 11 are arranged to be rotated about their axes for imparting angular movement to the laterally extending horizontal arms 14 mounted upon their upper ends. For this purpose, gears 18 are secured upon the outer column sections for engagement with racks 19 hydraulically actuated by suitable hydraulic rams 21. Fluid from the reservoir 8 is directed to the rams 21 through hose connections 22 provided with control valves 23.

A platform 24 is mounted upon the outer end of each laterally extending arm 14. Each platform is of a size and construction suitable for providing a stable support for a workman seated or standing thereon for pruning, spraying or harvesting fruit from the trees of an orchard. The control valves 13, 17 and 23 are positioned on or near the corresponding platforms 24 so that a workman supported upon a platform may cause the platform to be raised, extended laterally, and swung angularly as desired to bring the workman into proximity with a desired portion of an adjacent tree. By appropriate manipulation, the workman may readily elevate and shift his position around substantially half of the tree, so as to enable him to perform a desired operation, such as picking, without damaging the branches or, during a picking operation, without disturbing unripened fruit. The extensible frame sections 4 permit the platforms to be moved to give access to two quadrants of a tree without advancing the carriage from a position centrally located within a group of four trees.

Figure 7:
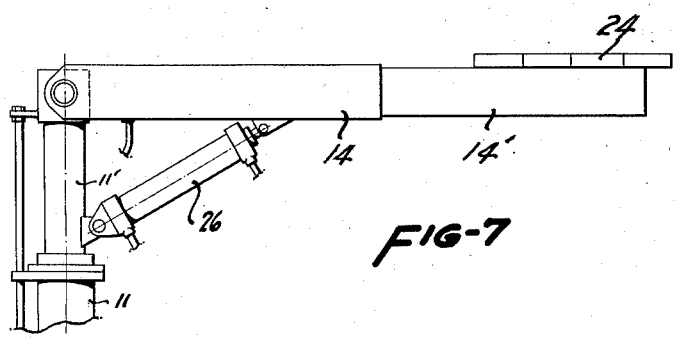
Fig. 7 is a fragmental detail view showing mechanism for tilting the horizontal supporting arms for the platforms.
Figure 8:
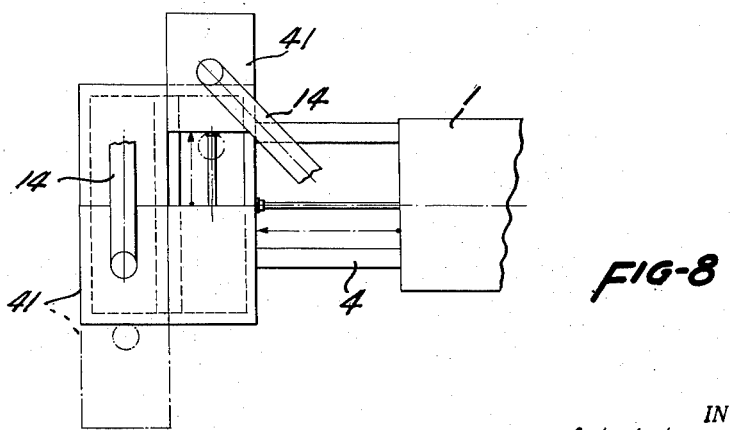
Fig. 8 is a fragmental detail view showing mechanism for transversely shifting the platform supporting means.

The laterally extending arms 14 may be swung toward the longitudinal axis of the main carriage, with one arm extending forwardly and the other rearwardly at the ends of the carriage to minimize the width and facilitate movement of the carriage between the rows of trees. To further reduce the width and permit movement of the carriage between rows of wide-spreading trees, the columns 11 are preferably mounted upon transversely shiftable frames 41 mounted upon the longitudinally extensible frame sections 4. The frames 41 are of a structure similar to the frame sections 4, and are operated in a similar manner to retract the platforms toward the longitudinal center line of the machine when the machine is to be advanced from one station to another, as indicated in Fig. 8 of the drawings. If desired the laterally extending arms 14 may be pivotally attached to the vertical columns 11; and tilting means, such as hydraulic rams 26, may be provided, as indicated in Fig. 7 of the drawings, for tilting the arms within a limited range to avoid interference with branches of the adjacent trees.

Associated with each platform 24 is a conveyor, designated in general by the numeral 27, arranged to extend from the platform to a hopper or receiving station 28 adjacent the vertical column 11. Each conveyor 27 comprises an endless belt or chain mounted for operation within a pair of telescoping troughs 29 and 30 pivoted to the corresponding platform and hopper respectively. The troughs are positioned in vertical alignment with the associated column 14, and form a unit which swings angularly about the vertical axis of the associated vertical column 11 with its horizontally extending arm.

Each conveyor 27 extends over pulleys or sprockets 31 and 32 adjacent the pivot points of the troughs 29 and 30, and over idler pulleys or sprockets 33 and 34 mounted within the telescoping ends of the troughs. The idler pulleys are movable toward and away from each other as the trough sections are moved toward and away from their fully telescoped relation. As each platform 24 is raised, lowered, and moved in and out laterally, the trough sections are separated or increasingly telescoped to accommodate vertical and lateral movement of the platform. At the same time, the trough and conveyor units swing bodily about the vertical axes of the columns 11 with which they are associated, in conformity with angular shifting of the associated arms 14. Consequently, the conveyors and troughs follow the platforms wherever they go, and serve to convey fruit from the platforms at any position thereof.

The conveyor belts or chains are actuated by suitable driving means, preferably by motors 36 of suitable size and power, mounted in association with one of the main or idler pulleys or sprockets of each conveyor, and independently operable to move the conveyor belts or chains in a fruit delivering direction. The length of belt or chain which extends in looped courses over the idlers 33 and 34 is paid out and taken in in conformity with the lengthening and shortening of the trough units, and permits the conveyor to extend to the hopper from the platform from any point within its range of movement.

To accommodate the axial movement of the frame sections 4 to and from the carriage 1, conveyor chains or belts 37 are mounted between the vertical cylinders 11 and a central receiving station 38 upon the carriage 1. The conveyors 37 are arranged to receive fruit from the hoppers 28 and convey the fruit to the central receiving station. The conveyors 37 operate over main and idler pulleys or sprockets in the manner of the conveyors 27, within similar telescoping trough units designated in general by the numeral 39. As the extensible sections 4 are moved in and out from the ends of the carriage 1, the conveyors 37 and troughs 39 are correspondingly lengthened or shortened to convey fruit from the hoppers 28 to the receiving station 38. A single conveyor 37 may be used for conveying fruit from the two conveyors 27 associated with the pairs of platforms at each end of the carriage, or a separate conveyor 37 may be provided for each platform 24 and conveyor 27. In either case, a single driving unit or motor 36 is provided for each conveyor unit so that the operation can be maintained and controlled regardless of the relative positioning of the platforms.

In operation, the carriage 1 is propelled or towed step by step to successive operating positions between groups of four trees of two adjacent rows. As the carriage is centered within the group the platforms are manipulated while the extensible sections 4 are in their retracted positions, so that the workmen may be moved over the adjacent quadrants of the trees. Thereafter, the extensible sections are moved outwardly to their extended positions and the platforms manipulated to carry the workmen around the quadrants remote from the carriage. In this manner, the workmen are enabled to operate over half of each tree at each corner of the carriage without advancing the carriage along the aisle between rows.

Workmen supported upon the platforms 24 individually operate the control valves 13, 17 and 29 to move the platforms vertically, laterally and angularly to desired positions around the adjacent trees, as indicated in Fig. 1. From each setting of the carriage, each workman may manipulate himself around substantially half of one of the adjacent trees without shifting the position of the carriage itself. When picking fruit, each workman can harvest only the fruit which has ripened to the desired degree without disturbing unripened fruit.

Because the platforms may be elevated and shifted laterally and angularly through a wide range of movement, the trees may be permitted to grow fuller and taller than is practicable when the fruit must be harvested from ladders. Since the conveyors 27 follow the platforms 24 throughout their range of movement, each workman may feed a continuous supply of fruit from his area without descending from his platform, and with a minimum of time and effort devoted to each tree. The carriage may be advanced across the orchard along the aisles between successive rows of trees to harvest the crop. Because the operation may be completed in relatively short time, it is practicable to traverse the orchard two or more times during a season, so as to harvest the crop at different stages of ripening.

The apparatus of course may be used in a similar manner for pruning, thinning, spraying, and for similar purposes at various seasons of the year.

Having thus described the invention, what I claim is:

1. Fruit picking apparatus comprising a mobile carriage, extensible frame sections mounted upon the carriage for movement axially of the carriage between retracted and extended positions at opposite ends of the carriage, a pair of platforms movably supported upon each of the extensible frame sections, means for independently shifting the platforms vertically, laterally and angularly relative to the carriage and frame sections, and extensible conveyor means mounted in association with each platform.

2. Fruit picking apparatus comprising a mobile carriage, extensible frame sections mounted for movement axially of the carriage between retracted and extended positions upon opposite ends of the carriage, hydraulic means for actuating the extensible frame sections, a pair of platforms supported upon each frame section, hydraulically actuated means for raising and lowering each of the platforms vertically with respect to the carriage, hydraulically actuated means for moving each of the platforms laterally with respect to the carriage, means for shifting each of the platforms angularly about the vertical axis of the raising and lowering means, and extensible conveyor means associated with each platform and arranged to extend from the carriage to the platform at any position thereof within its range of movement.

3. Fruit picking apparatus comprising a mobile carriage, extensible frame sections mounted for movement axially of the carriage between retracted and extended positions upon opposite ends of the carriage, hydraulic means for actuating the extensible frame sections, a pair of platforms mounted upon each frame section, hydraulically actuated means for independently raising and lowering the platforms vertically with respect to the carriage, hydraulically actuated means for independently moving the platforms laterally with respect to the carriage, means for shifting each platform angularly about the vertical axis of its raising and lowering means, and control means operable from each platform for controlling the movement thereof independently of the movement of the other platforms.

4. Fruit picking apparatus comprising a mobile carriage, extensible frame sections mounted for movement axially of the carriage between retracted and extended positions upon opposite ends of the carriage, hydraulic means for actuating the extensible frame sections, a pair of platforms supported upon each frame section, hydraulically actuated means for independently raising and lowering the platforms vertically with respect to the carriage, hydraulically actuated means for independently moving the platforms laterally with respect to the carriage, means for shifting each platform angularly about the vertical axis of its raising and lowering means, control means operable from each platform for controlling the movement thereof independently of the movement of the other platforms, and extensible conveyor means associated with each platform, one end of the conveyor means being attached to the platform for movement therewith to desired positions within its range of movement.

5. In an orchard apparatus, a mobile carriage movable along an aisle between adjacent rows of orchard trees, frame sections slidably mounted upon the carriage for movement axially therefrom between retracted positions in compact relation to the carriage and extended positions projecting from the carriage between adjacent trees of rows at opposite ends of the carriage, platforms mounted upon the frame sections, telescoping columns hydraulically extensible for raising and lowering the platforms relative to the carriage, telescoping arms hydraulically extensible for moving the platforms laterally with respect to the raising and lowering means, means for shifting the platforms angularly about the vertical axes of the columns, and conveyor means associated with each of the platforms said conveyor means being extensible by and in conformity with movement of the platform to and from any point within its range of movement for delivering fruit therefrom to a common delivery station adjacent the carriage.

6. In an orchard apparatus, a mobile carriage movable along an aisle between adjacent rows of orchard trees, a hydraulic power unit upon the carriage, frame sections slidably movable from retracted positions upon the carriage to extended positions outwardly extending from opposite ends of the carriage, hydraulically actuated means for moving the frame sections between their retracted and extended positions, a pair of vertically extensible hydraulic cylinders and pistons upon each frame section, a laterally extensible hydraulic cylinder and piston upon each vertical cylinder, hydraulic means for moving the cylinders and pistons between retracted and extended positions, and a platform carried by each laterally extensible cylinder and piston.

7. In an orchard apparatus, a mobile carriage movable along an aisle between adjacent rows of orchard trees, a hydraulic power unit upon the carriage, frame sections slidably movable from retracted positions upon the carriage to extended positions outwardly extending from opposite ends of the carriage, hydraulically actuated means for moving the frame sections between their retracted and extended positions, a pair of vertically extensible hydraulic cylinders and pistons upon each frame section, a laterally extensible hydraulic cylinder and piston upon each vertical cylinder, hydraulic means for moving the cylinders and pistons between retracted and extended positions, a platform carried by each laterally extensible cylinder and piston, and means for rotating each vertical cylinder about its vertical axis.

8. In an orchard apparatus, a mobile carriage movable along an aisle between adjacent rows of orchard trees, a hydraulic power unit upon the carriage, frame sections slidably movable from retracted positions upon the carriage to extended positions outwardly extending from opposite ends of the carriage, hydraulically actuated means for moving the frame sections between their retracted and extended positions, a pair of vertically extensible hydraulic cylinders and pistons upon each frame section, a laterally extensible hydraulic cylinder and piston upon each vertical cylinder, hydraulic means for moving the cylinders and pistons between retracted and extended positions, a platform carried by each horizontally extensible cylinder and piston, hydraulically actuated means for rotating each vertically extensible cylinder and its laterally extensible cylinder about the vertical axis of the vertically extensible cylinder, and conveyor means mounted in associated with each platform and extensible therewith to all positions within its normal range of movement.

9. In an orchard apparatus, a mobile carriage provided with a plurality of platforms independently movable vertically, laterally and angularly to support workmen at desired positions relative to adjacent trees, and an endless conveyor mounted in association with each platform, each conveyor being extensible by and with its platform in conformity with the movement thereof for conveying material from the platform to a central loading station adjacent the carriage.

10. In an orchard apparatus, a mobile carriage movable along an aisle between adjacent rows of trees, a plurality of platform supporting columns mounted in vertical positions upon the carriage, each column comprising a pair of telescoping sections relatively movable between retracted and extended positions, a platform supporting arm mounted in laterally extending position upon each column, each arm comprising a pair of telescoping sections relatively movable between retracted and extended positions, a platform mounted upon each arm, each platform being movable vertically and laterally in conformity with movements of its supporting column and arm between their retracted and extended positions, and means for moving each arm angularly about the axis of its supporting column.

11. In an orchard apparatus, a mobile carriage movable along an aisle between adjacent rows of trees, a plurality of platform supporting columns mounted in vertical positions upon the carriage, each column comprising a pair of telescoping sections relatively movable between retracted and extended positions, a platform supporting arm mounted in laterally extending position upon each column, each arm comprising a pair of telescoping sections relatively movable between retracted and extended positions, a platform mounted upon each arm, each platform being movable vertically and laterally in conformity with movements of its supporting column and arm between their retracted and extended positions, and an endless conveyor mounted in connection with each platform and extensible in conformity with movements thereof to extend from a delivery point adjacent the carriage to the platform at any position thereof within its range of movement.

References Cited in the file of this patent

UNITED STATES PATENTS

| | | |
|---|---|---|
| 1,010,297 | Michener | Nov. 28, 1911 |
| 2,428,184 | Swindler | Sept. 30, 1947 |
| 2,450,152 | Miller | Sept. 28, 1948 |
| 2,450,812 | Ray | Oct. 5, 1948 |
| 2,601,092 | Cardiff | June 17, 1952 |
| 2,614,893 | Merrill et al. | Oct. 21, 1952 |
| 2,616,768 | Stemm | Nov. 4, 1952 |